Figure 1:
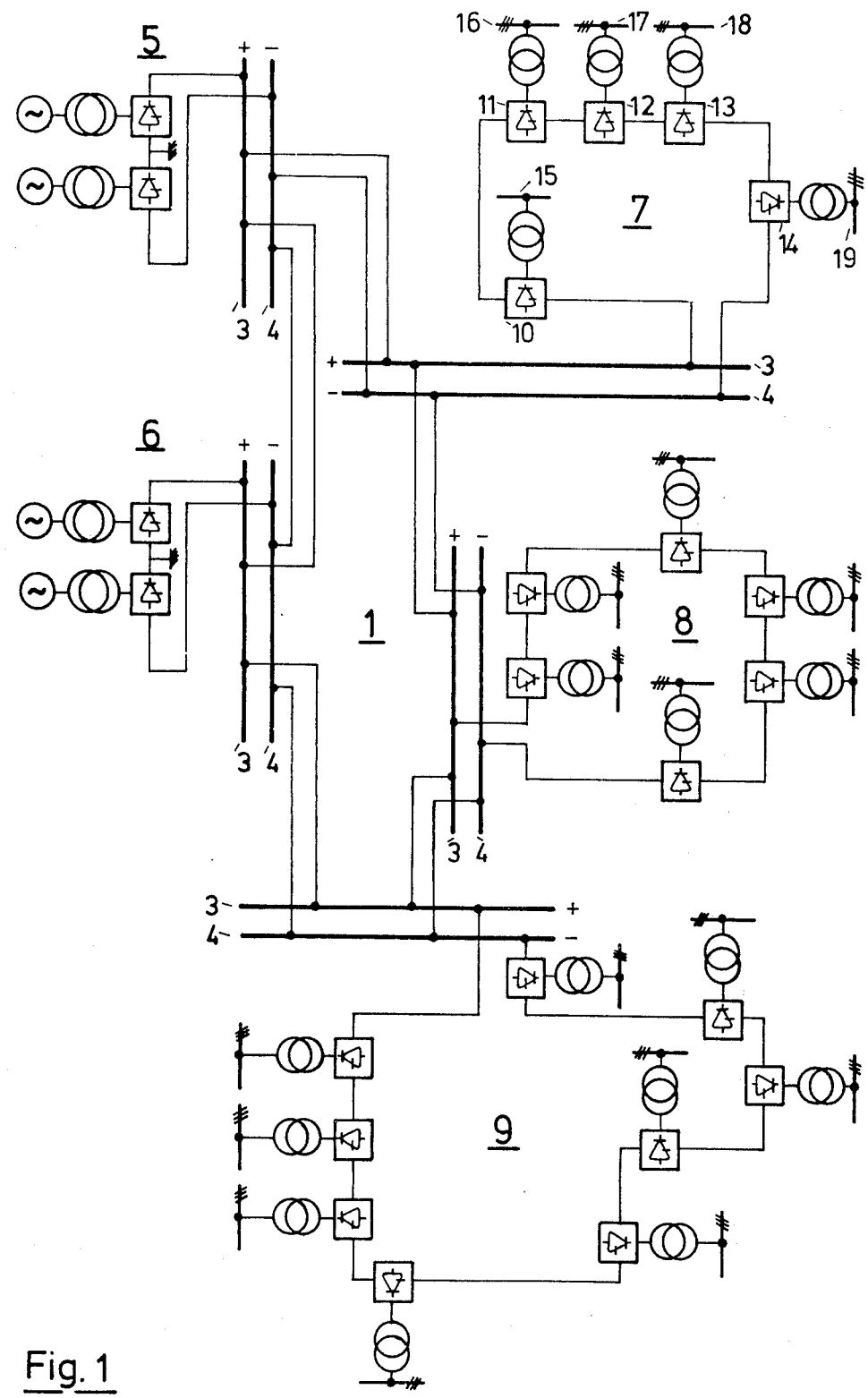

United States Patent [19]

Lips

[11] 4,019,115

[45] Apr. 19, 1977

[54] ENERGY TRANSMISSION SYSTEM WITH A COMMON MAIN FOR DIRECT CURRENT

[75] Inventor: Hans-Peter Lips, Schriesheim, Germany

[73] Assignee: BBC Brown Boveri & Company Limited, Baden, Switzerland

[22] Filed: July 14, 1975

[21] Appl. No.: 595,877

[30] Foreign Application Priority Data

July 25, 1974 Germany .......................... 2435755

[52] U.S. Cl. .............................. 321/27 R; 307/82
[51] Int. Cl.² ......................................... H02M 7/00
[58] Field of Search ............ 307/147, 145, 151, 11, 307/12, 58, 82; 321/27 R

[56] References Cited

UNITED STATES PATENTS 3,526,780   9/1970   Uhlmann et al. ..................... 307/82
3,536,930   10/1970   Stackegard .......................... 307/82

*Primary Examiner*—William M. Shoop
*Attorney, Agent, or Firm*—Pierce, Scheffler & Parker

[57] ABSTRACT

An energy transmission system includes a high-voltage direct-current transmission main in the form of a ring for supplying consumers located within the ring. The high-voltage d.c. main is fed from a three-phase network through rectifiers, and power output groups located at a plurality of points within the ring are connected to the latter. Each power group consists of a plurality of partial inverters connected in series between the poles of the d.c. main and an alternating current consumer network to be supplied is connected to the output of the inverters. Each output group of inverters includes a regulating device to monitor and regulate current and voltage to pre-set values dependent upon the power requirement of the inverter group such that one inverter of a group regulates the common direct-current applied to the output group and the other inverters of the group regulate their direct voltage so that the resulting sum voltage is equal to the amplitude of the direct voltage of the common main.

4 Claims, 4 Drawing Figures

ENERGY TRANSMISSION SYSTEM WITH A COMMON MAIN FOR DIRECT CURRENT

This invention relates to an energy transmission system with a common main which conducts direct current at very high voltage and is fed from at least one three-phase supply network or power station.

With such energy supply systems, which serve, for example, to supply densely populated conglomerated regions, the problem arises of transmitting energy, which is available at the periphery from the supra-regional grid system or is produced there, to the center of the region. Experiments have shown that an energy transmission system operated with direct current is suitable for this purpose, and by converting an existing three-phase cable to direct-current transmission, its transmission capacity can be substantially trebled. The individual three-phase networks or partial networks of the center of the region are then supplied by inverter stations which draw the energy from the direct-current system.

Because of the flexibility of the construction and of the flow of power, such a high-tension direct-current transmission network is operated in a so-called parallel circuit. The inverter stations generally have a relatively high capacity and are connected to a central point in the three-phase system or partial system fed. This leads to the disadvantage that, in view of the power fed in by the inverters, the three-phase networks fed have to be strengthened to carry it away. This additional strengthening of the three-phase network fed, which may be a 110 kV network for example, could be avoided if the inverter power could be fed into the three-phase network to be fed, from the direct-current network, in a decentralized manner, by stations of lower capacity. Such stations of lower capacity would likewise have to be connected in parallel, however. This is uneconomical because converter valves for high voltage but very low current are then needed for these inverter stations of lower capacity and the thyristors generally used therein would not be fully utilized.

It is, therefore, the object of the invention to avoid this disadvantage and to provide an energy transmission system of the type referred to at the beginning wherein there is a better utilization of the thyristors used for the inverter stations of low capacity.

According to the invention, this is achieved in that connected to a plurality of points in the common main, between the poles, are output groups connected in parallel, each of which consists of a plurality of partial inverters connected in series between the poles of the common main, associated with each of which is an alternating-current network or partial network to be supplied, and that a regulating device is provided to monitor the electrical quantities.

In a specific embodiment of the invention, the common main is constructed in the form of a ring and the circumference of the ring at least partially embraces the densely populated region to be supplied with electrical energy.

The sum of the rated voltages of the partial inverters within an output group can be selected equal to the rated voltage of the common main. This means that the total power of the output unit is divided between the partial inverters in proportion to their rated voltages. In order to increase the flexibility still further, however, the sum of the rated voltages of the partial inverters may be greater than the rated voltage of the common main, in which case the voltages which actually appear in operation can be so adjusted, by the control of the converters, that the required power distribution results and the sum voltage of the partial inverters is equal to the voltage of the common main.

In every case, associated with all the partial inverters of an output group is a common superimposed regulating device which pre-sets a direct-current desired value common to all the partial inverters and a direct-voltage desired value for each partial inverter in such a manner that the sum voltage is equal to the voltage of the common main.

The partial inverters may also feed directly into a 10 kV network instead of into the 110 kV three-phase network.

Figure 2:
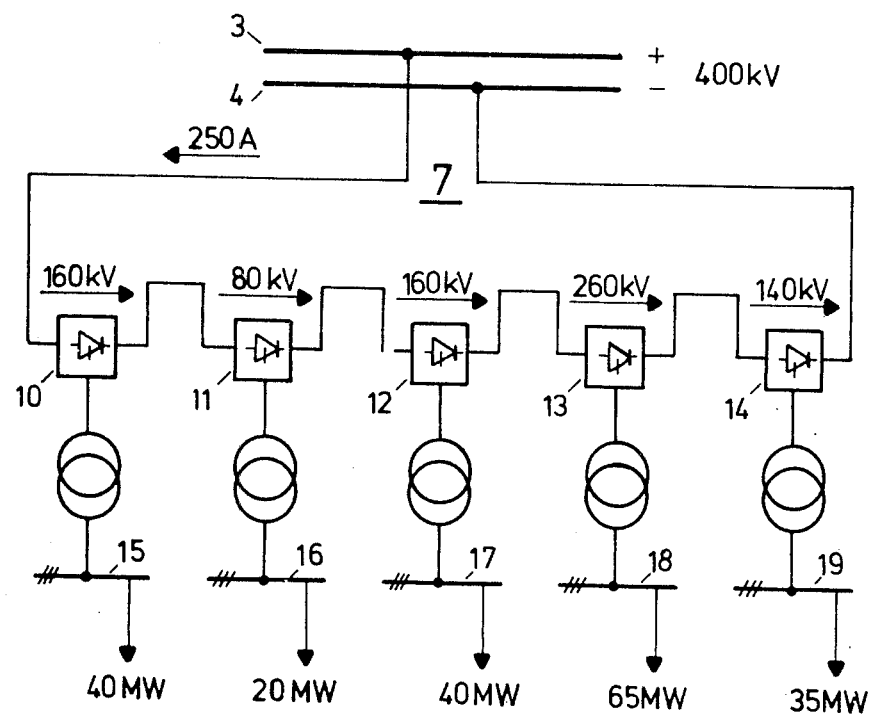
Figure 3:
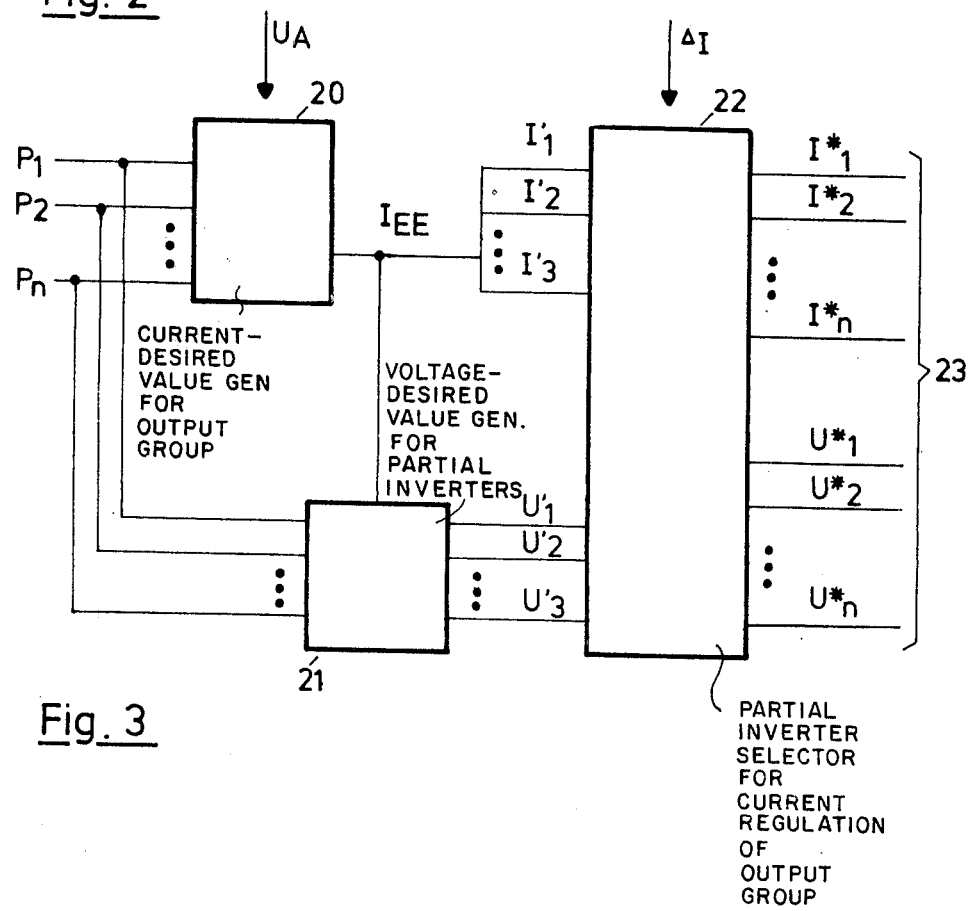
Figure 4:
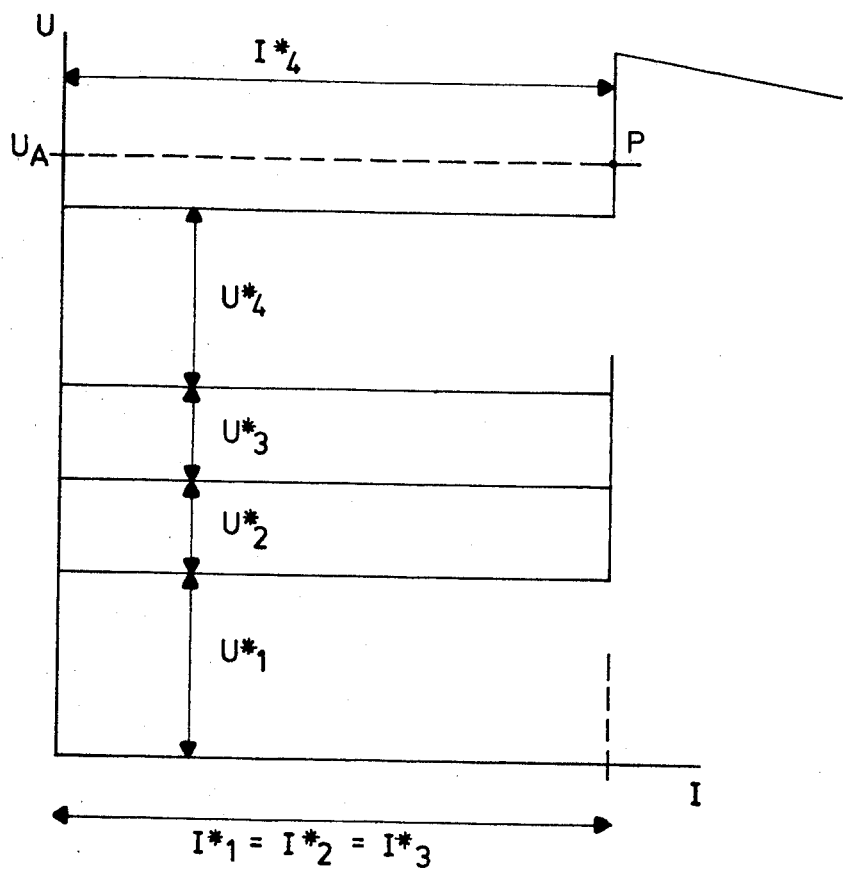

The invention is explained in more detail with reference to an example of an embodiment as illustrated by the accompanying drawings wherein:

FIG. 1 shows the whole network composed of energy generator, direct-current transmission system and three-phase networks to be fed, FIG. 2 shows the series-connected partial inverters of an output unit for a plurality of three-phase networks or partial networks to be fed, FIG. 3 is a block diagram of the superimposed regulating device of an output unit, and FIG. 4 shows the current/voltage regulating characteristics for the partial inverters within an output unit.

In FIG. 1 the high-voltage d.c. power transmission network is designated by 1, which is constructed in the form of a ring and consists of the positive bus bars 3 and the negative bus bars 4, which are connected to one another. The high-voltage d.c. power transmission network 1 is supplied with energy for example through two rectifier stations 5, 6 from three-phase generators through transformers and rectifier bridges. This energy is taken off through a plurality of output groups 7, 8, 9 of partial inverters, for example partial inverters 10, 11, 12, 13, 14 for the output group 7, and the partial inverters 10 to 14 feed into single-phase or polyphase alternating-current networks or partial networks 15 to 19 respectively. The partial inverters within each output group may be spatially separated from one another and be electrically connected in series by connecting lines or cables.

In FIG. 2, the output group 7 with its partial inverters 10 to 14 and the networks 15 to 19 to be fed by them are shown in more detail. If it is assumed, for example, that the positive and negative direct-current bus bars 3 and 4 respectively have a voltage of ± 400 kV compared with earth and a current of 250 A passes through all the partial inverters 10 to 14, the partial voltages indicated result at the inverters and the feedin powers indicated into the networks 15 to 19.

Accordingly, high-voltage d.c. transmission inverter stations of low capacity can be provided with a high voltage in the direct-current grid system. Despite the use of partial inverters connected in series, the freedom of energy exchange in the network between the output groups is not adversely affected. On the one hand the losses are kept low by the high voltage, and on the other hand the thyristors of the partial inverters are better utilized as regards current so that a satisfactory economical utilization can be achieved. As a result of this arrangement, the number of high-voltage direct-current transmission power circuit breakers with which the output units are coupled to the direct-current network is also smaller.

For the regulation of the transmission power, it must generally be assumed that the voltage on the common main remains constant and that, on the other hand, the partial inverters within an output group should adjust the power taken freely; accordingly, the current and voltage desired values of the partial inverters within an output group must be coordinated, and the sum of the voltages of the partial inverters must be equal to the voltage of the common main, while all the partial inverters carry the same current.

This is achieved by the fact that with n partial inverters within an output unit, $n-1$ partial inverters are equipped with a voltage regulator which regulates their direct voltage to a predetermined desired value, and that the $n^{th}$ partial inverter is equipped with a current regulator which regulates the current for a whole output group to a predetermined desired value. In order to increase the flexibility, all the partial inverters may be equipped both with a current regulator and with a voltage regulator, so that each partial inverter can regulate either the current of the output group or its voltage as required. In this case, the partial inverters with voltage regulation are given a current-desired value which is higher, by a certain amount $\Delta I$ than the desired value for the output group, while the current-regulating partial inverter is given a voltage-desired value which is lower, by a certain amount $\Delta U$, than the value necessary for achieving the required power.

FIG. 4 shows the resulting regulating characteristic $\Sigma EE$ for an output group of four partial inverters for example. In this, $U_1^*$ to $U_4^*$ are the voltage-desired values and $I_1^*$ to $I_4^*$ the current-desired values of the partial inverters. The operating point of the output group is then at the point of intersection P between the sum characteristic $\Sigma EE$ and the applied voltage $U_A$ of the common main shown in broken lines.

The coordination of the desired values of the individual partial inverters is effected in a central desired-value setting means which is present for each output group and is indicated diagrammatically in FIG. 3. The power requirements of the individual partial networks are conveyed to this desired-value setting means. From these it determines, in a device 20, the total power requirement of the output group and, with the aid of the voltage $U_A$ on the common main, the current-desired value $I_{EE}$ of the output group, and, in a device 21, the voltage-desired values of the partial inverters. Futhermore, in a device 22, it determines in accordance with pre-set criteria, which partial inverter is to take over the current regulation for the output group by modifying the desired values $I_1'$ to $I_n'$ and $U_1'$ $U_n'$ found in the devices 20 and 21, in the required manner. The desired values $I_1^*$ to $I_n^*$ and $U_1^*$ to $U_n^*$ thus obtained are then transmitted to the individual partial inverters by means of transmission channels 23 and are there further processed in known manner.

In this manner, the output groups for the common main act like a single current-regulated station. The regulation of the transmitted power on the common main can then be effected in accordance with one of the known methods for high-voltage direct-current multi-point transmission network operation, for example that described in German patent DT-PS 1,588,967.

I claim:

1. In an energy transmission system provided with a common main which conducts direct-current at high voltage and is fed from at least one three-phase network or power station through rectifiers, the improvement characterized in that connected to a plurality of points in the common main, between the poles are output groups connected in parallel, each of which consists of a plurality of partial inverters connected in series between the poles of the common main, associated with each of which partial inverters is an alternating-current network or partial network to be supplied, and that a regulating device is provided to monitor the electrical quantities.

2. An energy transmission system as claimed in claim 1, characterized in that the common main is constructed in the form of a ring and the circumference of the ring at least partially embraces the region to be supplied.

3. An energy transmission system as claimed in claim 1, characterized in that the alternating-current networks or partial networks to be supplied have a voltage of 110 kV.

4. An energy transmission system as claimed in claim 1, characterized in that the alternating-current networks or partial networks to be supplied have a voltage 10 kV.

* * * * *